July 21, 1925.　　　　　　　　　　　　　　　　1,546,975
C. FELLER
FISH SPLITTING KNIFE
Filed Oct. 21, 1924
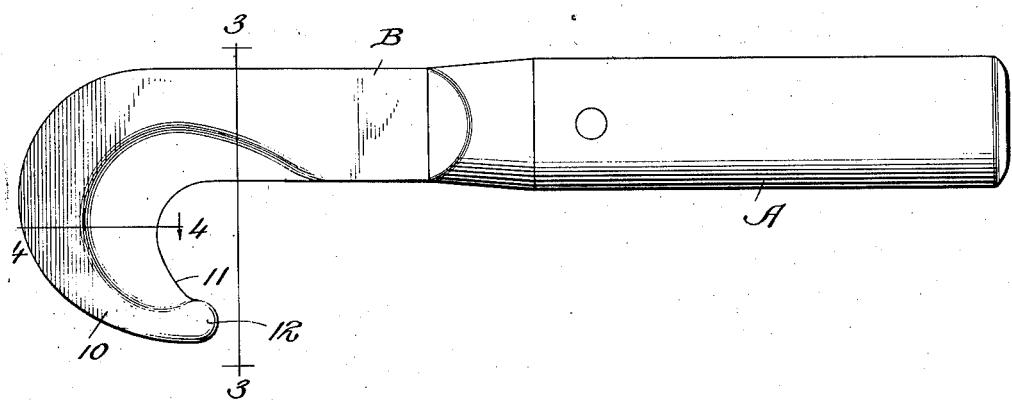
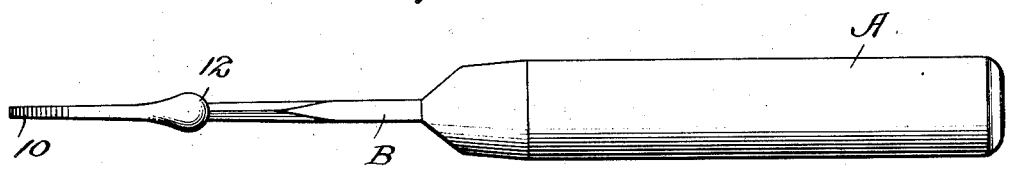
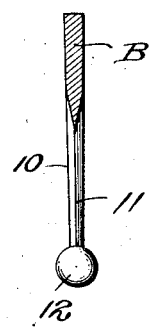
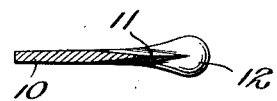
Inventor
Charles Feller,
by Bright & Bailey
Attorneys Patented July 21, 1925.

1,546,975

UNITED STATES PATENT OFFICE.

CHARLES FELLER, OF MARSHFIELD, OREGON.

FISH-SPLITTING KNIFE.

Application filed October 21, 1924. Serial No. 744,899.

*To all whom it may concern:*

Be it known that I, CHARLES FELLER, a subject of the King of Great Britain, and resident of Marshfield, in the county of Coos and State of Oregon, have invented certain new and useful Improvements in Fish-Splitting Knives, of which the following is a specification.

My invention relates to fish splitting knives of a type particularly adapted for splitting roe shad, but it will be understood that the inventive concept can be utilized to advantage in the construction of knives for splitting other roe fish.

In producing my invention it has been my purpose to provide a construction which will prevent injury to the roe of the fish in the operation of splitting even though such operation is performed without exercising undue care. By thus avoiding the necessity of careful effort in the operation of splitting, it is possible to materially increase the rapidity of such labor.

Furthermore, it is the purpose of my invention to provide a knife of the character specified which will be of such simple design as to enable the same to be manufactured and sold at a comparatively small cost.

In describing my invention in detail reference will be had to the accompanying drawing wherein like characters of reference denote corresponding parts in the several views and in which—

Figure 1 is a side view of a fish splitting knife constructed in accordance with my invention;

Figure 2, an edge view of same;

Figure 3, a section on the line 3—3 of Figure 1; and

Figure 4, a section on the line 4—4 of Figure 1.

In the drawings my improved knife is shown as comprising a handle A carrying a blade B. The outer end of this blade is curved laterally in the form of a hook as at 10, so as to provide a rearwardly directed knife edge 11. I provide the free terminal of the curved portion 10 with a rearwardly directed bead 12 rounded both at its free end and transversely. This bead extends substantially parallel to the inner end of the blade B and a portion of its outer surface forms a continuation of the outer edge of said blade.

In use of the knife it will be apparent that the hook end 10 is engaged under the skin of the fish at the forward end of its lower side and then drawn rearwardly to sever the skin throughout substantially its entire length. During this operation it will be obvious that the rounded bead 12 will ride over the roe of the fish without mutilating or injuring the same in any manner even though the operation be carelessly performed.

I claim.

A fish splitting knife including a blade having its free end portion curved laterally and sharpened to provide a cutting edge, and a bead formed at the extreme free end of said laterally curved portion presenting substantially a spherical surface to the roe of a fish when the knife is operatively applied thereto whereby puncture of the roe of the fish by the knife is prevented irrespective of irregular lateral movements of the knife during the splitting operation.

In testimony whereof I hereunto affix my signature.

CHARLES FELLER.